Dec. 15, 1959     J. A. BUVELOT     2,917,134
TREAD BRAKE ARRANGEMENT
Filed March 11, 1955     5 Sheets-Sheet 3
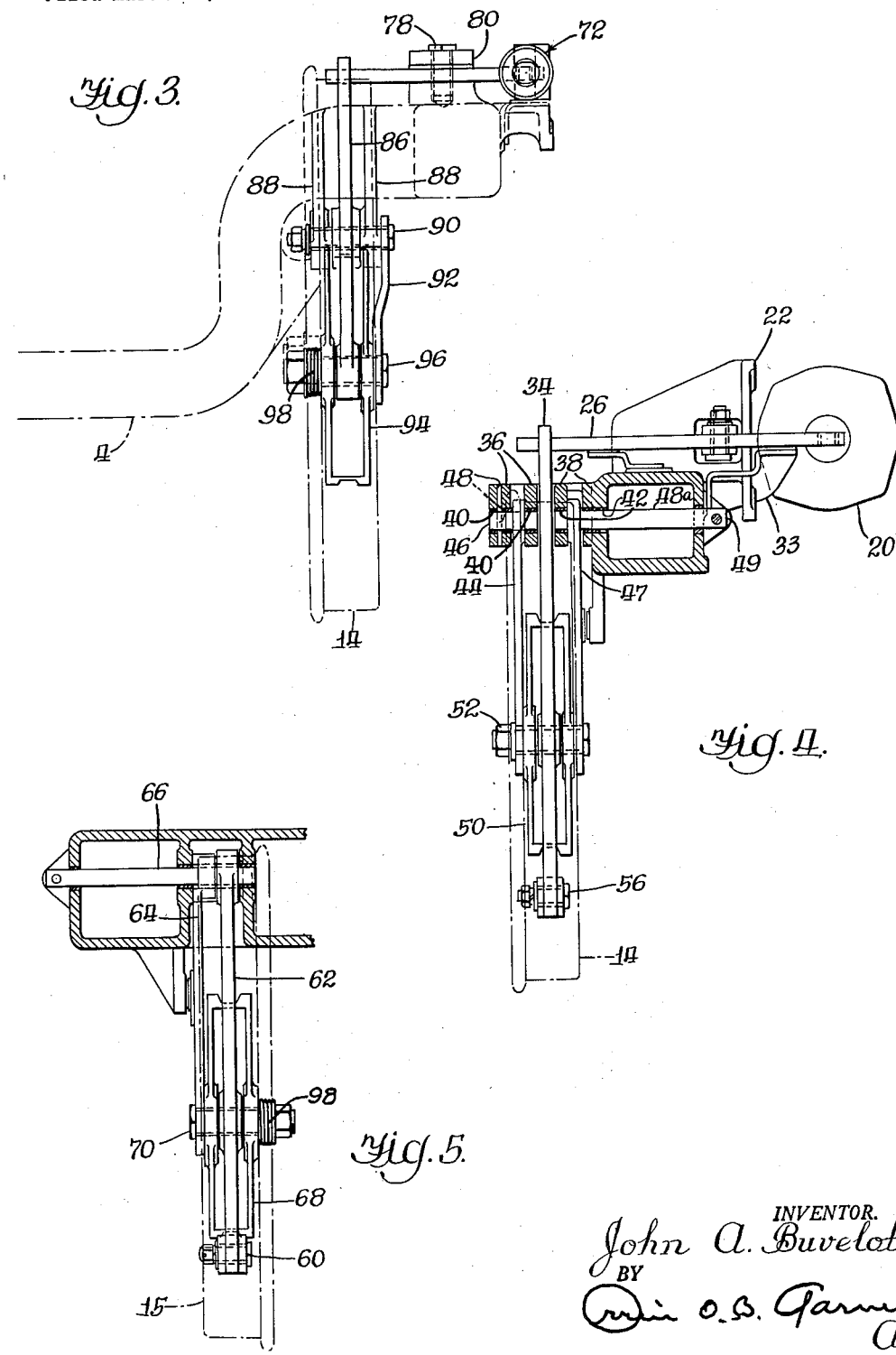
INVENTOR.
John A. Buvelot
BY
O. B. Garner
Atty.

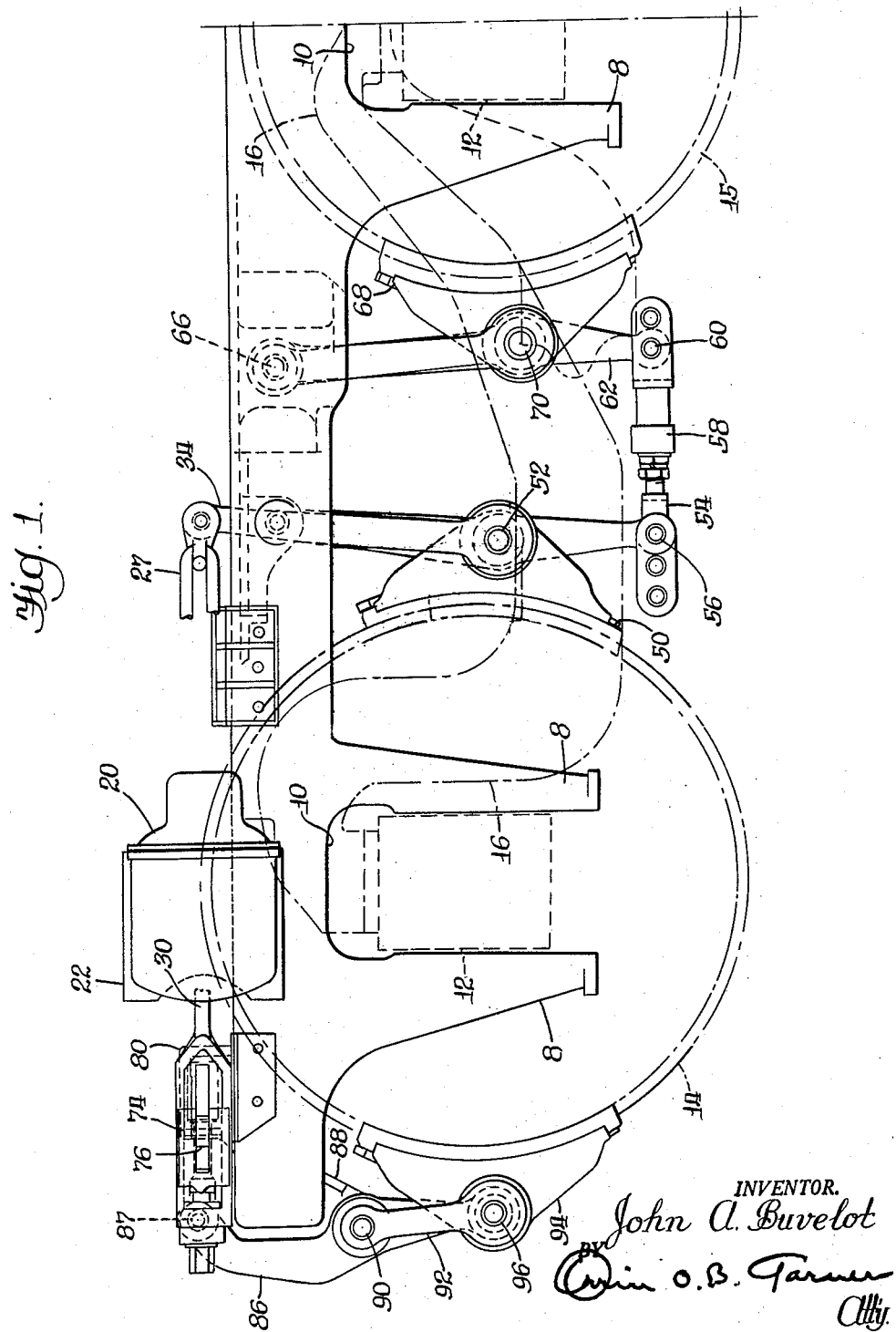

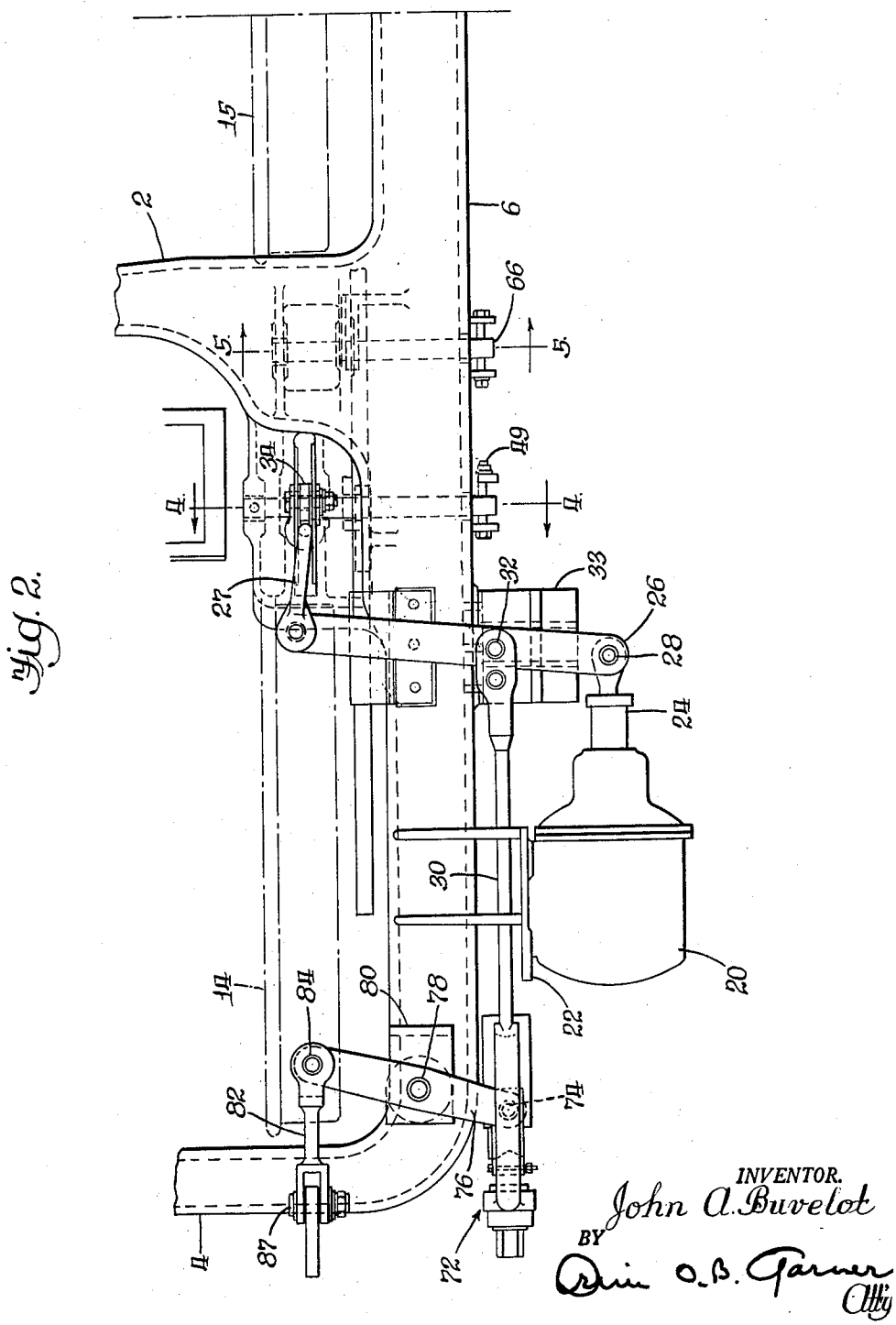

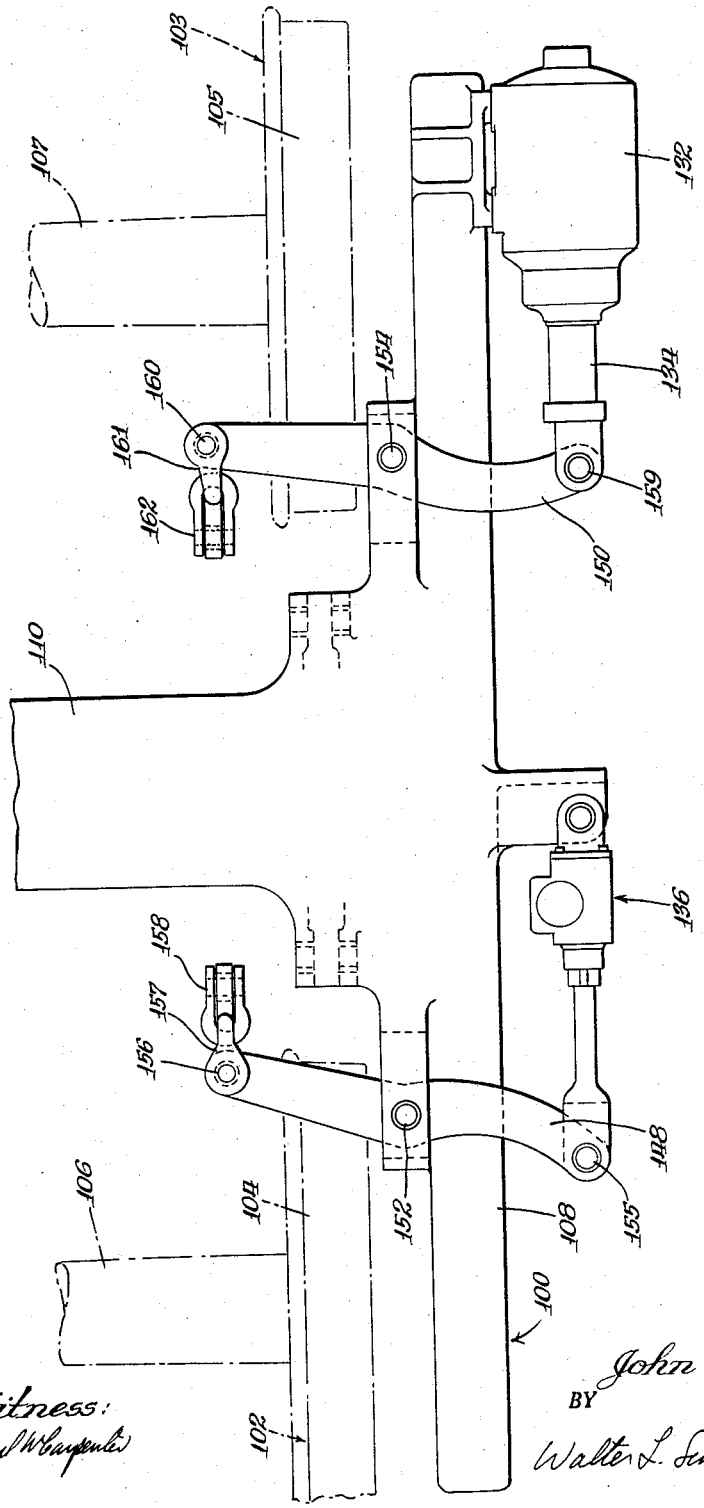

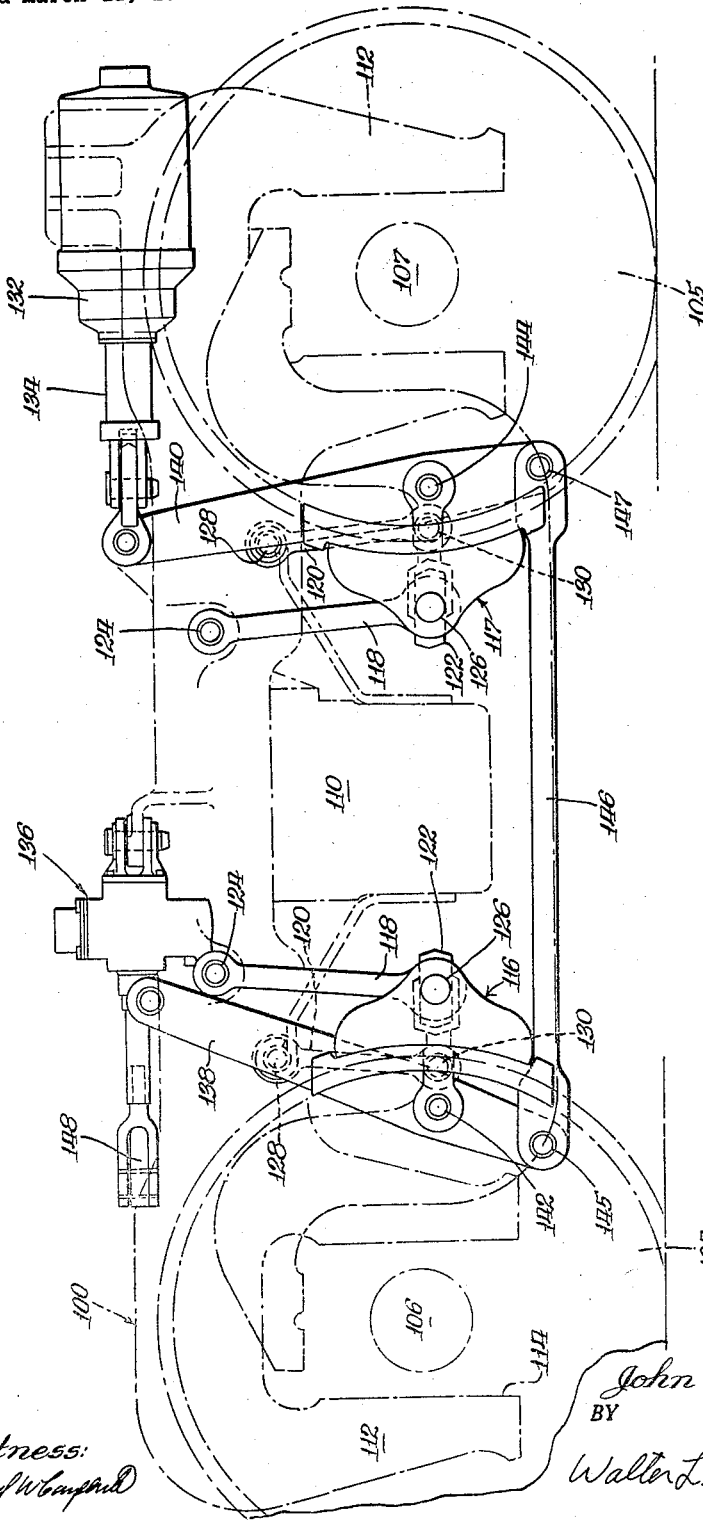

United States Patent Office 2,917,134
Patented Dec. 15, 1959

2,917,134

TREAD BRAKE ARRANGEMENT

John A. Buvelot, Chicago, Ill., assignor to American Steel Foundries, Chicago, Ill., a corporation of New Jersey Application March 11, 1955, Serial No. 493,606

5 Claims. (Cl. 188—56)

My invention relates to a brake mechanism or brake rigging for use on railway car trucks and more particularly to that type of rigging wherein brake means are applied to the outer periphery of each wheel. The instant application is a continuation-in-part of my application Serial No. 305,816, filed August 22, 1952, in the United States Patent Office and now abandoned.

An object of my invention is to provide a unit cylinder brake arrangement suitable for use on a railway car truck having either four or six wheels.

Another object of the invention is to provide a brake arrangement wherein the power means is carried by the truck frame.

A more specific object of the invention is to provide a brake arrangement having a live brake lever carrying brake means for one wheel, a dead brake lever carrying brake means for another wheel, and a compression rod interconnecting said levers.

Another specific object of the invention is to provide a clasp brake arrangement for a truck wherein a plurality of power cylinders are supported on the truck frame, each power cylinder being operable to actuate associated brake equipment independent of the other power means and wherein each power cylinder actuates the brake equipment associated with one wheel and a portion of the equipment associated with an adjacent wheel.

These and other objects of my invention will become apparent in the course of the following description and examination of the drawings, wherein:

Figure 1 is a fragmentary side elevational view of a railway car truck embodying one form of my invention;

Figure 2 is a fragmentary plan view of the structure of Figure 1;

Figure 3 is an end elevational view of the structure of Figure 1;

Figure 4 is a sectional view taken along line 4—4 of Figure 2;

Figure 5 is a fragmentary sectional view taken along line 5—5 of Figure 2;

Figure 6 is a fragmentary plan view of a railway car truck illustrating another embodiment of the invention, only one half of the truck being shown as the other half may be similar, and Figure 7 is a side elevational view of the structure shown in Figure 6.

In the drawings certain details are omitted from various views where it is believed said details are more clearly shown in other views.

Describing the structure in detail, the truck frame of conventional design comprises a transom 2, an end rail 4 integrally formed with a side rail 6, said side rail having the usual pedestals 8, 8 forming therebetween journal openings 10, 10 for association in the conventional manner with journal boxes 12, 12, said truck frame being supported from the journal ends of the wheel and axle assemblies having wheels indicated at 14 and 15, by means of equalizers 16 and the conventional coiled springs (not shown).

As the brake mechanism for the truck is identical in each of the four quadrants thereof, the brake equipment for only one quadrant of said truck is shown and described. The brake mechanism comprises the power cylinder 20 mounted on the truck frame by bolting or welding to the bracket 22, which in turn is fixedly secured to the side rail 6. A piston rod 24 extends from one end of the power cylinder and makes pivotal connection with the outboard end of a live actuating or cylinder lever 26, as shown at 28. The cylinder lever 26 extends generally inboardly of the truck and is provided, intermediate its ends, with a floating pivotal connection to the connecting rod 30, as at 32. A support bracket 33 may be bolted to the side rail 6 at the area immediately below the lever 26, thus providing support for said lever during the action hereinafter described. The inboard end of the lever 26 is provided with a conventional pivotal clevis connection 27 with the upper end of a live brake lever 34.

Referring now to Figures 1 and 4, it will be seen that the frame is provided with mounting brackets 36 and 38 having the axially aligned bushed holes 40 and 42, respectively. A brake hanger 44 has its upper end pivotally fixed to the bracket 36 as at 46, the pin accomplishing said connection being held in place by a locking key which may be disposed in the registering holes 48. Another brake hanger 47 has its upper end pivotally pinned to the bracket 38, as at 48a, the pin extending through the mentioned aligned holes 42 and outboardly of the frame where bolt and slot engagement with wings integrally formed on the frame is provided as at 49 to fixedly secure the pin in position. It will be noted that a clearance slot is provided between the brackets 36 and 38 to accommodate movement of the live brake lever 34 longitudinally of the frame.

The brake lever 34 and the brake hanger 44 and 47 depend from the truck frame and make pivotal connection to a brake shoe assembly 50 as at 52. The point of connection to the brake shoe assembly 50 marks the lower extremities of the hanger 44 and 47, but the brake lever 34 extends below the shoe to make pivotal connection with one end of the compression or push rod 54, as at 56. It will be noted that the compression rod 54 may be provided with a standard slack adjusting device 58.

Referring now to Figures 1 and 5, it will be seen that the compression rod 54 is pivotally connected as at 60 with the lower extremity of a dead brake lever 62. As best seen in Figure 5, the dead brake lever 62 and the hanger 64 have their upper ends pivotally pinned to the frame as at 66 in a manner similar to that provided at 48a and 49. The lower extremity of the hanger 64 and an intermediate portion of the brake lever 62 provide pivotal mounting for another brake head assembly 68 as at 70.

Referring now to Figures 2 and 3, it will be seen that the connecting rod 30 extends generally longitudinally of the truck frame through clearance holes provided in the supporting gusset plates of the bracket 22 to a point adjacent the end of the frame whereat said rod 30 presents a conventional slack adjusting device 72. Inasmuch as the slack adjusting device 72 is not per se part of the disclosed invention, it will not be necessary to describe its structure in detail. It will be noted, however, that the connecting rod 30 is forked adjacent the slack adjusting end to provide for reception of and pivotal pin connection to the outboard end of a dead actuating lever 76. The pin connection between the connecting rod 30 and the lever 76 is indicated at 74. Intermediate the ends of the lever 76, a fixed pivotal connection to the frame is provided as at 78 by means of the bracket 80 which is integrally formed with the side rail 6. The inboard end of the dead lever 76 is pivotally connected to one end of a push rod 82, as at 84. The opposite end of the push rod 82 pivotally connects with the upper end of another dead brake lever 86 as at 87.

As best seen in Figure 1, the brake lever 86 has an upper portion of irregular contour to complement the contour of the adjacent portion of the frame. It will be noted that a bracket 88 is integrally formed with the end rail 4 and side rails 6 of said frame, said bracket providing aligned holes to pivotally support or fulcrum the brake lever 86 intermediate its ends, as at 90. In addition, the pivot point 90 rotatably supports the hanger 92 which depends therefrom to pivotally connect, along with the lower extremity of the brake lever 86, to a brake head assembly 94, as at 96.

It will be noted that in both Figures 3 and 5 a spring 98 is compressed between the retaining nut of the related pivot pin and the associated brake head flexibly urging the head to tightly engage the related hanger, thereby preventing the head from pivoting.

In operation, actuation of the power cylinder 20 causes the piston rod 24 to move to the right, as seen in Figure 2. This movement of the piston rod urges the live actuating or cylinder lever 26 to move to the right and concurrently to pivot counterclockwise about the pivotal connection 32 of the rod 30. Counterclockwise motion of the lever 26 is carried through the clevis connection 27 to the live brake lever 34. Initially the brake lever 34 is urged to pivot counterclockwise (Figure 1) about the pivotal connection 56 of the compression rod 54, thereby bringing the brake shoe assembly 50 into engagement with the tread of the related wheel 14. After engagement of the assembly 50 with the wheel 14 the counterclockwise movement of the lever 34 continues, but now rotation is about the pivot point 52. This secondary motion of the lever 34 is carried through the compression rod 54 thereby urging the dead brake lever 62 to rotate counterclockwise about the pivot point 66 bringing the carried brake shoe assembly 68 into frictional engagement with the tread of the associated wheel 15.

As noted, actuation of the power cylinder moves lever 26 to the right (Figure 2) carrying with it the connecting rod 30, which in turn causes a counterclockwise rotation of the connected dead actuating lever 76 about the pivot point 78. The counterclockwise motion of the lever 76 is transmitted through the connected push rod 82, which in turn urges the dead brake lever 86 to rotate counterclockwise about the pivot 90 thereby bringing the brake shoe assembly into engagement with the tread of the related wheel 14.

It should be noted that the above described action is virtually simultaneous, that is, upon actuation of the power cylinder 20, all the brake assemblies are immediately brought into frictional engagement with the related wheels, hence act concurrently to decelerate rotation of the wheel and axle assemblies.

It will also be noted that the reverse movement of the power cylinder and the piston rod causes the various parts to move in the reverse direction, thus releasing the entire braking mechanism.

Although the above embodiment of the invention is described as applied to a six-wheel railway car truck, the same basic invention can be applied to a four-wheel railway car truck as in the embodiment illustrated in Figures 6 and 7.

It will be seen that the truck is conventional and comprises a frame 100 supported by spaced wheel and axle assemblies 102 and 103 which include wheels 104 and 105 and axles 106 and 107, respectively.

The truck frame comprises a pair of side members or frames 108 (only one of which is shown) spaced from each other and interconnected by a transverse member or bolster 110. The side frame may include the usual pedestals 112 having journal openings 114 for association with journal boxes (not shown) which support the journal ends of the wheel and axle assemblies in a conventional manner.

Conventional brake shoe assemblies 116 and 117 associated with wheels 104 and 105, respectively, may be movably supported from the truck frame by means of brake hangers, each brake shoe assembly being provided with inner and outer hangers 118 and 120, respectively. The brake shoe assemblies may be used singly or at both sides of the truck and when so used, may be interconnected by a brake beam 122 having its ends formed integrally with or secured to the brake shoe assemblies in a conventional manner. The inner hangers 118 have their upper ends pivotally connected to the side frame at 124 and their lower ends pivotally connected to the brake shoe assembly at 126. The outer hangers 120 have their upper ends pivoted to the truck frame at 128 and their lower ends pivoted to the brake beam 122 at 130.

A conventional power cylinder 132 having a piston 134 may be mounted to the side frame adjacent one of the wheels.

A conventional slack adjusting device 136 may also be mounted on the side frame preferably at a point adjacent another of the wheels and spaced at a distance from the power cylinder.

The brake shoe assemblies 116 and 117 may be connected to a pair of dead and live brake levers 138 and 140, preferably by pivotal connections 142 and 144, respectively, intermediate the ends of the respective brake levers.

The brake levers are interconnected by a compression rod 146 which is positioned in the rotative plane of the wheels and disposed entirely between the axles of the respective wheel and axle assemblies. The lower ends of brake levers 138 and 140 are pivotally connected to the ends of the compression rod at points 145 and 147, respectively.

A pair of dead actuating levers 148 and 150, fulcrumed intermediate their respective ends to the frame at pivots 152 and 154, respectively, may serve to connect the brake levers to the power cylinder and slack adjusting device. Actuating lever 148 has at its outboard end a pivotal connection 155 with the slack adjusting device and at its inboard end a pivotal connection 156 to link or clevis 157 which is pivoted to brake lever 138 at point 158. Inasmuch as pivotal movement of the actuating lever 148 would be restricted by its connection to the slack adjusting device, the brake lever 138 is in reality fulcrumed at a fixed point 158 with respect to the frame and for all practical purposes may be considered a dead brake lever, the position of which is adjustable through the slack adjusting device.

Actuating or cylinder lever 150 has at its outboard end a pivotal connection 159 with the piston 134 of the power cylinder and at its inboard end a pivotal connection 160 with a link or clevis 161 which is pivoted to the upper end of brake lever 140 at point 162. Thus the brake lever 140 is a live lever not being fulcrumed at a point fixed with respect to the frame.

In operation, actuation of the power cylinder 20

To describe the operation of this embodiment of the invention, it will be noted that as the piston 134 of the power cylinder 132 is actuated, it moves forward, or to the left as seen in Figure 6, moving the outboard end of actuating lever 150 which pivots in a clockwise direction about pivot 154. As the inboard end of the actuating lever carries link 161 and brake lever 140 to the right, lever 140 pivots at its lower end about point 147 and carries brake shoe assembly 117 into engagement with wheel 105. As the brake shoe assembly engages the wheel, the pivotal point of the brake lever is transferred from point 147 to the brake shoe assembly pivot 144, and the brake lever continues to rotate clockwise about pivot 144. As the compression rod moves to the left, as seen in Figure 7, it pushes the lower end of brake lever 138 to the left. As brake lever 138 rotates in a clockwise direction about clevis fulcrum point 158, the brake shoe assembly 116 is brought into engagement with wheel 104.

The slack in the linkage caused by the normal wear of the brake shoes is taken up by the slack adjusting device in a conventional manner.

Thus it will be seen that in the applications of both embodiments, a novel linkage has been provided wherein a compression rod interconnects the lower ends of live and dead brake levers carrying brake means associated with separate wheels of a railway car truck.

I claim:

1. In a brake arrangement for a six-wheel railway car truck having a frame supported on a center and a pair of end wheel and axle assemblies, the combination of: a power cylinder mounted on the frame adjacent one corner thereof and having a piston; friction means disposed adjacent opposite sides of each wheel; and linkage means connecting the power cylinder piston to both the friction means associated with a related end wheel and to one of the friction means associated with a related center wheel; said linkage means including one dead vertical brake lever disposed outwardly adjacent said related end wheel and fulcrumed intermediate its ends to the frame and pivoted at its lower end to the outer friction means associated with said related end wheel, a live vertical brake lever disposed inwardly adjacent said related end wheel and pivoted intermediate its ends to the inner friction means associated with said related end wheel, another dead vertical brake lever disposed between said live brake lever and said center wheel and fulcrumed at its upper end to the frame and pivoted intermediate its ends to said one friction means associated with said center wheel, a push rod pivotally interconnecting the lower ends of said live brake lever and said other dead brake lever, a live generally horizontal cylinder lever having its outboard end pivotally connected to the power cylinder piston and having its inboard end pivotally connected to the upper end of said live brake lever, a dead generally horizontal actuating lever fulcrumed intermediate its ends to the frame and having its inboard end pivotally connected to the upper end of said one dead brake lever, and a pull rod pivotally interconnecting the outboard end of the dead actuating lever and a medial portion of the cylinder lever.

2. In a brake arrangement for a six-wheel railway car truck having a frame supported on a center and a pair of end wheel and axle assemblies, the combination of: a power cylinder mounted on the frame adjacent one corner thereof and having a piston; friction means disposed adjacent opposite sides of each wheel; and linkage means connecting the power cylinder piston to both the friction means associated with a related end wheel and to one of the friction means associated with a related center wheel; said linkage means including one dead vertical brake lever disposed outwardly adjacent said related end wheel and fulcrumed to the frame and pivoted to the outer friction means associated with said related end wheel, a live vertical brake lever disposed inwardly adjacent said related end wheel and pivoted to the inner friction means associated with said related end wheel, another dead vertical brake lever disposed between said live brake lever and said center wheel and fulcrumed to the frame and pivoted to said one friction means associated with said center wheel, a rod pivotally interconnecting said live brake lever and said other dead brake lever, a live generally horizontal cylinder lever pivotally connected to the power cylinder piston and pivotally connected to said live brake lever, a dead generally horizontal actuating lever fulcrumed to the frame and pivotally connected to said one dead brake lever, and a rod pivotally interconnecting the dead actuating lever and the cylinder lever.

3. In a brake arrangement for a railway car truck having a frame supported on a plurality of wheel and axle assemblies, the combination of: first friction means disposed adjacent one side of one wheel; second friction means disposed adjacent the opposite side of said one wheel; third friction means disposed between an adjacent wheel and said second friction means; a power cylinder mounted on the frame near said one wheel and having a piston; and linkage means connecting the power cylinder to all the friction means; said linkage means including a first dead vertical brake lever fulcrumed intermediate its ends to the frame and pivotally connected at its lower end to the first friction means, a live vertical brake lever pivotally connected intermediate its ends to the second friction means, a second dead vertical brake lever, fulcrumed at its upper end to the frame and pivotally connected intermediate its ends to the third friction means, a push rod pivotally interconnecting the lower ends of the live brake lever and the second dead brake lever, a generally horizontal live cylinder lever pivotally connected at its inboard end to the upper end of the live brake lever and pivotally connected at its outboard end to the power cylinder piston, a generally horizontal dead actuating lever fulcrumed intermediate its ends to the frame and pivotally connected at its inboard end to the upper end of the first dead brake lever, and a pull rod pivotally interconnecting the outboard end of the actuating lever and a medial portion of the cylinder lever.

4. In a brake arrangement for a railway car truck having a frame supported on a plurality of wheel and axle assemblies, the combination of: first friction means disposed adjacent one side of one wheel; second friction means disposed adjacent the opposite side of said one wheel; third friction means disposed between an adjacent wheel and said second friction means; a power cylinder mounted on the frame near said one wheel and having a piston; and linkage means connecting the power cylinder piston to all the friction means; said linkage means including a first dead vertical brake lever fulcrumed to the frame and pivotally connected to the first friction means, a live vertical brake lever pivotally connected to the second friction means, a second dead vertical brake lever, fulcrumed to the frame and pivotally connected to the third friction means, a rod pivotally interconnecting the live brake lever and the second dead brake lever, a generally horizontal live cylinder lever pivotally connected to the upper end of the live brake lever and pivotally connected to the power cylinder piston, a generally horizontal dead actuating lever fulcrumed to the frame and pivotally connected to the first dead brake lever, and a rod pivotally interconnecting the actuating lever and the cylinder lever.

5. A clasp brake arrangement according to claim 4, wherein the connection between the dead actuating lever and the rod includes a slack adjusting device.

References Cited in the file of this patent

UNITED STATES PATENTS

| | | |
|---|---|---|
| 2,112,530 | Holloway | Mar. 29, 1938 |
| 2,133,531 | Blomberg | Oct. 18, 1938 |
| 2,416,960 | Simanek | Mar. 4, 1947 |
| 2,716,468 | Simanek | Aug. 30, 1955 |